W. NEUHS.
JOURNAL BOX.
APPLICATION FILED AUG. 9, 1909.

958,758.

Patented May 24, 1910.

ATTEST
E. M. Fisher
J. C. Mussun.

INVENTOR
WERNER NEUHS.
BY Fisher & Mour ATTYS.

UNITED STATES PATENT OFFICE.

WERNER NEUHS, OF CLEVELAND, OHIO.

JOURNAL-BOX.

958,758.  Specification of Letters Patent.  Patented May 24, 1910.

Application filed August 9, 1909. Serial No. 511,899.

*To all whom it may concern:*

Be it known that I, WERNER NEUHS, citizen of the United States, residing at Cleveland, in the county of Cuyahoga and State of Ohio, have invented certain new and useful Improvements in Journal-Boxes for Cars, of which the following is a specification.

My invention relates to journal boxes for cars, and the invention consists in a construction of box which is adapted to prevent easy removal of the brass bearing and thereby prevent the bearing from being stolen, all substantially as shown and described and particularly pointed out in the claims.

Figure 1:
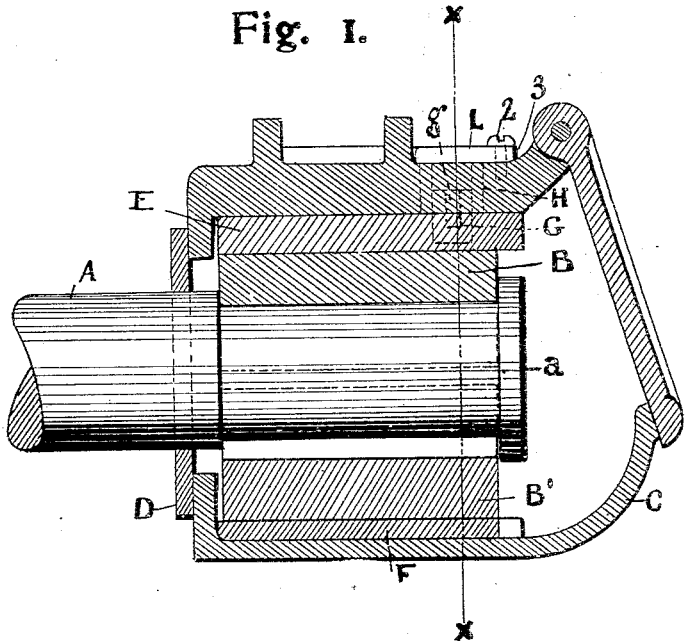
Figure 2:
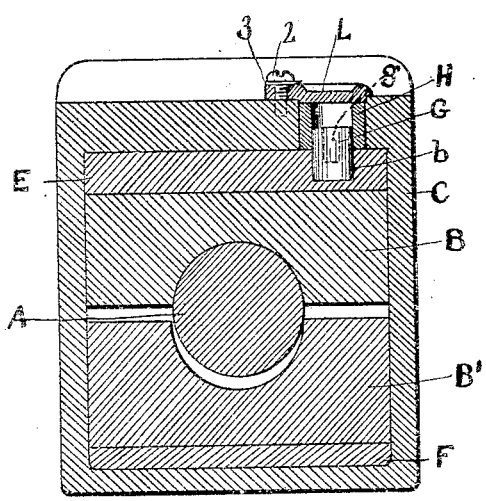
Figure 3:

In the accompanying drawings, Figure 1 is a sectional elevation of a journal box embodying my invention with an axle therein, and Fig. 2 is a cross section of said box and axle on line $x$—$x$, Fig. 1. Fig. 3 is a sectional elevation of the pin for fastening the parts.

The idea herein is to prevent thieves from stealing the brass bearings from journal boxes in cars which use such bearings and stand exposed in open yards easy of access, and thus protect railroad companies from constant loss and annoyance on this account. Heretofore such bearings have usually been put in place within the boxing in such manner that they were held without any precautionary means for preventing their easy removal.

My invention contemplates fastening the bearings in the boxes in such manner that they cannot be abstracted or taken out without special tools or appliances for that purpose and then not in a manner that will be profitable to thieves. Very generally, the class of persons who steal brasses of this kind are tramps or unskilled and inexperienced men who are not provided with implements adapted to tamper with the fastening means I provide, and hence while the precaution may not be an exclusive one, it still serves to afford very general and satisfactory protection.

Referring to the drawings A is a car axle, B a bearing block, and C a box or casing carrying said bearing. Other parts are associated with these, such as a collar D about the axle outside box C, a flat plate E next above or over upper bearing or bearing member B, and, in this instance, a lower brass bearing or bearing member B' with a plate F beneath or between the same and the bottom of box C. Usually, however, the lower bearing B' is omitted and only the upper bearing B is employed. But whether the lower bearing be used or not, it has been possible heretofore, as these parts have been constructed, to jack up the body of the car so that the axle will drop down and make it easy to draw out the upper bearing. Now, I provide against this easy obstruction of said bearing by boring a hole $b$ into or through key plate E and drop a plug or bolt G therein through a registering hole in the top of box C. The body of said plug is made of brass or like metal that will not respond to a magnet, and carries a hard iron or equivalent core $g$ its full length, practically.

This construction and arrangement serves at least two purposes, as it enables me to draw the plug out with a suitably strong magnet and prevents sawing or cutting off of the plug by a chisel inserted from the outside over plate E in order to remove the bearing B. Otherwise it would be possible to drop the shaft and bearing down far enough to introduce a chisel from the outside between the parts and sever the plug or bolt and then remove the bearing, but a hard core in the plug prevents this from being done and also affords a response to a suitable magnet to withdraw the plug from above when desired. It will be observed also that the bore $b$ for the plug does not extend clear through the bottom of plate E, though it may, and this prevents the introduction of an instrument from beneath to remove the plug by lifting it out of its cavity. Obviously the bearing B cannot be removed without removing the key plate E. In this way I make the bearing safe as against all persons who may be equipped with ordinary tools to remove the same, and this includes all cases of common or unskilled thieving. Finally a bushing or sleeve H of brass is set into the bore in casing C to promote removal of plug G by a magnet, the said sleeve preventing the force of the magnet from being expended upon the iron casing, and over said bore or hole I place a cap or cover L.

The head of plug or bolt G is dropped down beneath the top surface of the box or casing C at least far enough to prevent the head from being engaged by a tool from without to lift the plug out of its seat, and to reach the same with a magnet requires that the magnet be constructed to be inserted into said bore, thus imposing comparatively hard conditions precedent to removing said bolt and without which the brass bearing B cannot be extracted. It will further be observed that the axle has a bead or rim or flange $a$ about its outer end and outside bearing B and overlapping the same the full depth of said bead or rim and thus assisting in confining said bearing. The cap L over the bore for plug or bolt G has a recessed edge adapting a portion thereof to drop down into the bore while a screw 2 is engaged through an extension 3 on the cap in box C and fastens the cap irremovably in place except as the said screw is removed. Then the other hard conditions against removal still hold. In this connection it is noted that the name of applicant appears in a forfeited application bearing Ser. No. 422,626 and which involved some of the features shown and claimed herein.

What I claim is:

1. In journal boxes, a box and a bearing block therein and a key plate between said box and bearing block, and a plug inserted through the top of said box into said key plate and having its upper end dropped beneath the surface of said block, and an insulating bushing in the block about the top of said plug.

2. A journal box and a bearing therein and a key plate next over said bearing and said box and plate provided with a bore from the top, in combination with a plug having a conducting core inserted in said bore from above and having its top dropped beneath the top of said bore, thereby preventing exposure of the plug for removal.

3. In journal boxes for cars, a box and a bearing therein and a key plate between said parts, in combination with a car axle having an enlargement about its end confining said bearing, said box and plate provided with a bore from the top, a plug inserted in said bore and adapted to lock said parts together, said plug having a non-conducting body and a conducting core and shorter than the bore in which it is placed, thus preventing easy removal.

In testimony whereof I affix my signature in presence of two witnesses.

WERNER NEUHS.

Witnesses:
E. M. FISHER,
F. C. MUSSUN.